United States Patent [19]
Papst et al.

[11] 4,214,690
[45] Jul. 29, 1980

[54] AXIAL LOCATING OF HORIZONTALLY EXTENDING TAPE DRIVE SHAFT IN CASSETTE MACHINE

[75] Inventors: Georg Papst, St. Georgen; Volker Schlicker, Radevormwald; Rolf Müller, St. Georgen, all of Fed. Rep. of Germany

[73] Assignee: Papst Motoren KG, St. Georgen, Fed. Rep. of Germany

[21] Appl. No.: 955,639

[22] Filed: Oct. 27, 1978

[30] Foreign Application Priority Data

Oct. 31, 1977 [DE] Fed. Rep. of Germany ....... 2748805

[51] Int. Cl.² ........................................... B65H 17/18
[52] U.S. Cl. ...................................... 226/49; 226/188; 226/194; 242/198; 308/163; 310/90; 360/96.1
[58] Field of Search ..................... 226/49, 46, 47, 168, 226/188, 190, 194; 242/197, 198, 199, 200, 206; 360/96.1–96.6; 310/66, 90, 91, 261, 273; 308/15, 135, 163, 219, 232

[56] References Cited

U.S. PATENT DOCUMENTS

| | | | |
|---|---|---|---|
| 3,602,415 | 8/1971 | Gross | 226/188 |
| 3,754,696 | 8/1973 | Rietbergen | 226/188 X |
| 3,832,734 | 8/1974 | Childress, Jr. et al. | 242/198 X |
| 3,949,919 | 4/1976 | Takei | 242/206 X |
| 3,961,375 | 6/1976 | Mika et al. | 242/198 X |
| 4,050,087 | 9/1977 | Kishi | 242/198 X |
| 4,106,686 | 8/1978 | Valliant et al. | 226/188 |
| 4,133,497 | 1/1979 | Rothlisberger | 242/200 |
| 4,148,579 | 4/1979 | Axelrod et al. | 242/198 X |

*Primary Examiner*—Stanley N. Gilreath
*Attorney, Agent, or Firm*—Michael J. Striker

[57] ABSTRACT

A magnetic-tape cassette machine of the type including a horizontally extending tape drive shaft and a loading platform designed to hold the cassette upright during tape transport. To prevent the horizontally extending tape drive shaft from shifting axially during tape transport, one end of the shaft is supported against a first axial bearing secured to the machine housing and the other end is supported by an axial bearing secured to the loading platform. Alternatively, a single axial bearing is used limiting axial shifting of the tape drive shaft in one direction, and a permanent-magnet arrangement pulls the tape drive shaft in the same direction to prevent the shaft from shifting axially in the opposite second direction.

17 Claims, 6 Drawing Figures

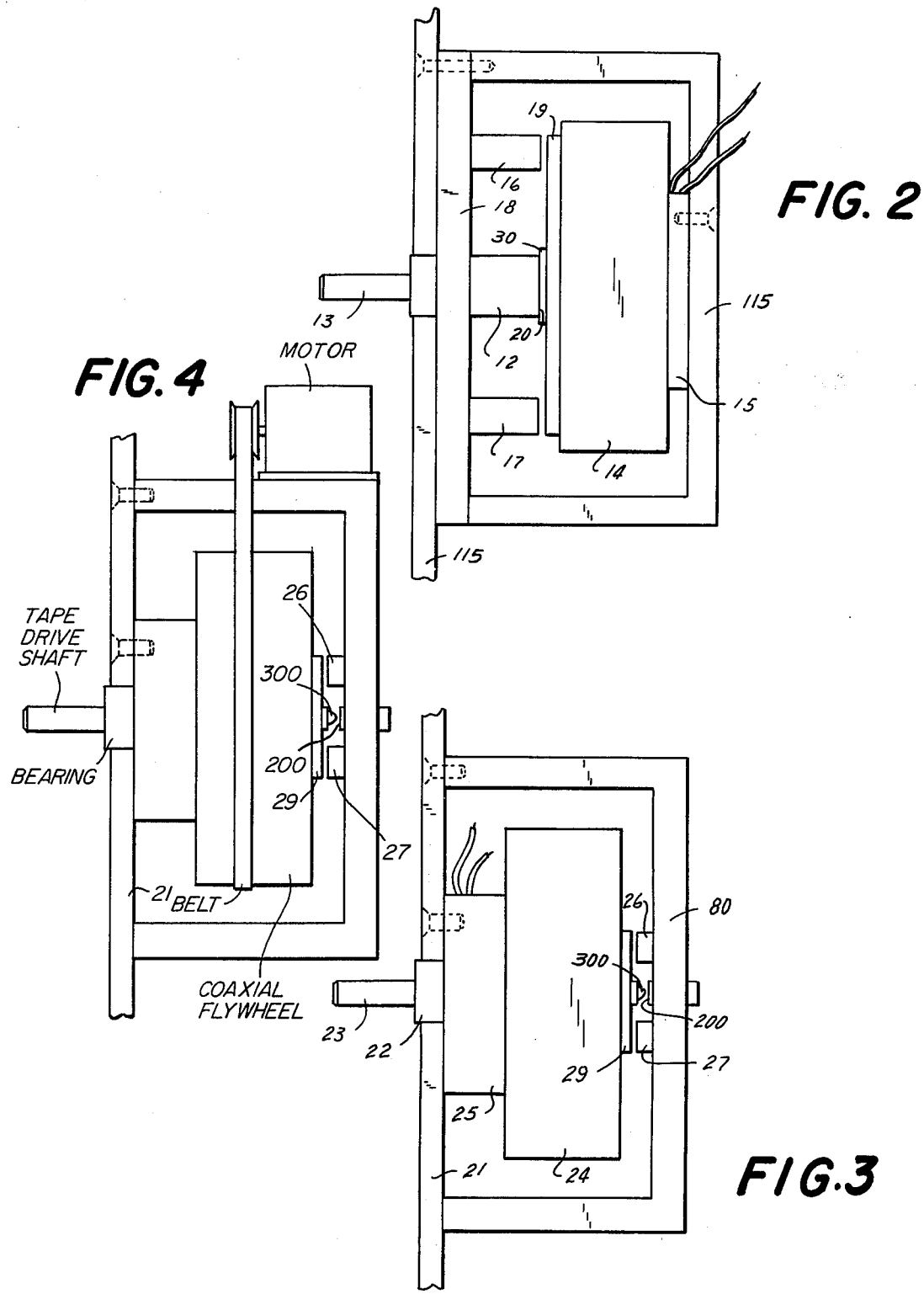

AXIAL LOCATING OF HORIZONTALLY EXTENDING TAPE DRIVE SHAFT IN CASSETTE MACHINE

BACKGROUND OF THE INVENTION

The present invention concerns structures for axially bearing and locating the drive shaft of a magnetic-tape cassette recording and/or reproducing apparatus, when the latter is of the type in which the drive shaft extends horizontally and the cassette loading platform is oriented vertically so that an inserted cassette stands in an upright position in the apparatus.

With cassette machines of this type, a very important problem is to completely eliminate all axial play in the mounting of the drive shaft of the apparatus, i.e., the shaft carrying or serving as the capstan. Specifically, if during cassette machine operation the horizontally extending drive shaft shifts axially in either a regular or irregular fashion, corresponding fluctuations develop in the velocity with which the magnetic tape sweeps across the record and/or playback head of the machine, resulting in acoustic wow and/or flutter.

This is inherently a more serious problem in cassette machines with horizontally extending drive shafts, compared to those designed with upright drive shafts, because in the latter case the weight of the drive shaft itself and of its mounting structure contributes significantly to the axial stabilization of the location of the drive shaft.

In vertical-drive-shaft cassette machines of the front-loading type, the magnetic-tape cassette is pushed, in a direction parallel to the rotation axis of the drive shaft of the machine, onto the rotary spool-rotating pegs of the machine and, as this is done, the magnetic tape extending between the two spools of the cassette comes into engagement with the capstan part of the machine's drive shaft. In the past with this particular type of cassette machine, the bearing located at the same side as the drive pin of the machine is designed as an axial bearing applying axial-shift resisting force to the drive shaft from only one side thereof, inter alia by applying a spring biasing force against the peripheral surface of the bushing of the drive shaft, to eliminate axial shifting of the drive shaft in this manner.

That kind of axial bearing is, however, quite expensive to produce if the requisite degree of resistance to axial shifting of the drive shaft is really to be established by application of force to the drive shaft from one side. Furthermore, precisely because of the particular technique employed, the drive shaft must now turn against the circumferential component of this biasing force, i.e., against elevated frictional resistance. However, it is of course generally desirable not to work against unnecessarily high frictional resistance, and this is indeed quite important, for example, in the case of battery-powered cassette machines.

SUMMARY OF THE INVENTION

Accordingly, it is the general object of the invention to provide a cassette machine with means which axially bear against and locate the horizontally extending drive shaft in a simple way, and furthermore in a way which does not inherently increase power consumption in the sense of the prior-art technique described above.

According to one concept of the invention, this can be achieved by employing an axial bearing and locating system which comprises a first axial bearing located on a stationary part of the cassette-machine housing and bearing against a first axial end of the drive shaft, and a second axial bearing which is located on the movable cassette loading platform of the machine and bears against the other axial end of the drive shaft.

Using this inventive technique, it furthermore becomes possible to use a point-contact bearing not merely at the axial end of the drive shaft which is remote from the cassette, but also at the axial end at the cassette. This is truly optimum with respect to minimizing frictional forces against which the machine's motor must work and, as will become clearer below, can make possible various extremely simple and convenient spatial relationships for the location and mounting of the motor or its drive shaft.

According to a very advantageous feature of the invention, the second axial bearing, i.e., the one provided on the movable cassette loading platform of the machine, comprises an elastically resilient biasing element serving to press the bearing element proper against the second axial end face of the drive shaft.

In this way, it becomes quite simple to inherently compensate for variations or tolerance in the exact location of the movable loading platform in successive cassette machines of a production run. Likewise, the precision of the means used to movably mount the loading platform or, equivalently, the precision of the path of loading-platform movement, does not become more critical or problematic when the inventive axial bearing and locating technique is employed.

According to a further advantageous concept of the invention, the axial bearing element proper of the second axial bearing, i.e., the one on the loading platform, is a hemispherical element. Alternatively, the axial end face of the drive shaft against which the second axial bearing bears can be hemispherical. This greatly minimizes unnecessary frictional loading. Furthermore, if the axial bearing element on the loading platform is hemispherical and presses against a flat axial end face of the drive shaft, this avoids the development of radial forces even if the exact location and orientation of the second axial bearing is not predetermined with extreme precision; this is explained in greater detail further below.

In order to avoid the use of a second axial bearing, e.g., the hemispherical bearing referred to above, the invention contemplates providing a single axial bearing which of itself resists axial shifting of the horizontal drive shaft in only one axial direction. However, a magnetic structure is then provided to apply a magnetic pulling force which pulls the drive shaft against the axial bearing, i.e., so as to prevent the drive shaft from moving relative to the axial bearing in the second axial direction.

The advantage of this latter technique is that only a single axial bearing need be employed to establish, quite simply and with a high degree of precision, bi-directional axial locating of the horizontal drive shaft. Indeed, because the single axial bearing can be located remote from the axial end of the drive shaft near the cassette, the drive shaft end near the cassette can be kept uncluttered by axial bearing structure.

A particularly preferred embodiment of the principle just described results when the magnetic pulling force is established by a closed magnetic system, the latter comprising a permanent magnet secured to a stationary part of the cassette-machine housing and, to close off the magnetic system and provide a complete circuit for magnetic flux, an annular flux-conducting element rigidly connected to and rotating with the horizontally extending drive shaft.

This latter expedient makes it particularly simple to balance the drive shaft and thereby achieve the requisite uniform-speed operation; or otherwise stated, this latter expedient adds nothing to the problem of balancing the drive shaft.

In order not to interfere with uniform rotation of the drive shaft, it is advantageous to use for the aforementioned stationary permanent magnet two component magnets located exactly diametrally opposite to each other, relative to the rotation axis of the drive shaft. This prevents the development of radially oriented forces such as might tend to tilt the drive shaft.

According to one particular preferred concept of the present invention, the cassette-machine drive shaft is constituted by the rotor shaft of a collectorless D.C. motor provided with compensatory reluctance-torque generating structure, such as disclosed in commonly owned U.S. Pat. No. 3,840,761, the disclosure of which is incorporated herein by reference. In that event, the magnetic circuit used in accordance with the present invention for axially locating the drive shaft additionally, and in certain applications very advantageously, acts as an eddy-current brake. As explained in commonly owned application Ser. No. 910,005 filed May 26, 1978, the magnitude of the reluctance torque produced can be adjusted by the manufacturer of the motor by adjusting the depth to which the rotor penetrates into the stator; because of this, and due to the high additive component of the total motor torque represented by the eddy-current brake, the amount by which the magnitude of the total motor torque can be changed by changing the depth of rotor penetration into the stator field is quite small, likewise making for very small manufacturing tolerances.

Accordingly, it is also of advantage to locate the axial-position-maintaining magnetic circuit radially remote from the drive shaft, because in that way the eddy-current component can be kept high, i.e., when this is desired.

In contrast, if this is not desired, e.g., because the drive shaft is to be of overhung design, or because energy consumption is to be minimized as in the case of a battery-powered cassette machine, then it is advantageous to keep the eddy-current component low by locating the axial-position-maintaining magnetic circuit radially close to the drive shaft. In that event, care must be taken to assure that the drive shaft does not itself become magnetized in a sense that might effect the magnetization of the cassette tape; however, with the materials conventionally employed, this is not actually any great problem.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1b depicts a reversal of the relationships shown in FIG. 1a;

FIG. 2 depicts a secondary exemplary embodiment;

FIG. 3 depicts a third exemplary embodiment; and

FIG. 4 depicts a fourth exemplary embodiment of the indirect-drive type.

DESCRIPTION OF THE PREFERRED EMBODIMENTS

Figure 1:
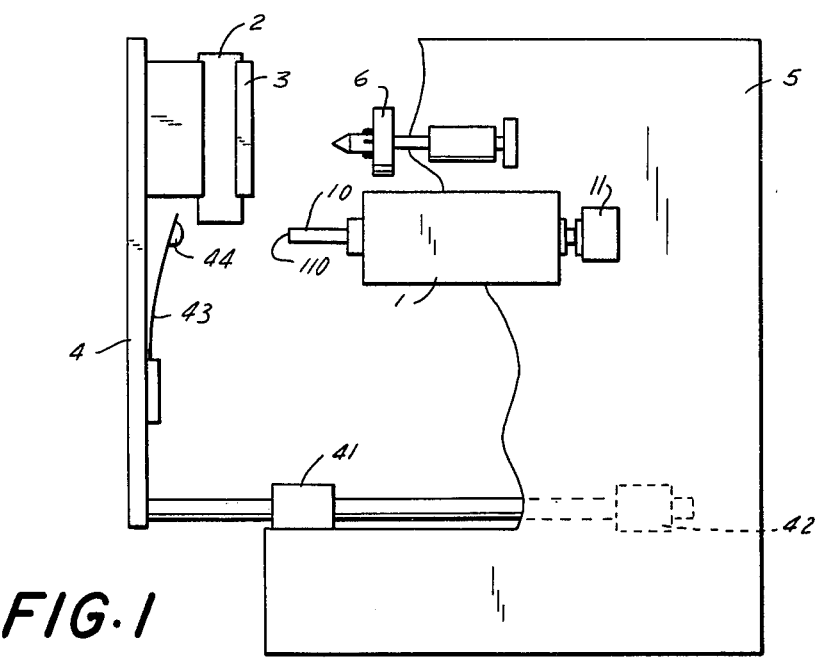
FIG. 1 depicts a first exemplary embodiment of the invention.

FIG. 1 schematically depicts a magnetic-tape cassette machine of the type in which the tape cassette is upright and the tape drive shaft is horizontal during use of the machine. Numeral 1 denotes the drive motor of the machine, e.g., a speed-regulated D.C. motor, provided with an axially extending drive shaft 10. Numeral 2 denotes a tape cassette inserted into the guide chute 3 of the movable loading platform 4. Numeral 5 denotes the housing of the cassette machine, and numeral 6 one of the two rotary spool-rotating pins of the cassette machine. The loading platform 4 is shiftably mounted on bearings 41, 42 located on stationary parts of the machine housing 5, i.e., so that after a cassette 3 has been dropped into guide chute 3 with loading platform 4 in the illustrated inoperative position, platform 4 can be pushed rightwards into operative position, in which the spool-rotating pegs 6 enter into the spools of the cassette and the drive shaft 10 engages and can drive the cassette tape.

In this embodiment, the cassette machine is of the direct-drive type and the drive shaft 10 is constituted by the rotor shaft of drive motor 1. The right axial end of shaft 10 is limited by a first axial bearing 11, provided on a stationary part of the machine housing 5. For example, the right end face of drive shaft 10 may be hemispherical, with the bearing element 11 constituted by a flat plate of hard metal against which the hemispherical end face rests in substantially point-contact.

The left axial bearing for the horizontal drive shaft 10 is provided on the loading platform 4 and comprises a spring 43 having a lower end secured to platform 4 and having a free end which carries the bearing element 44 proper. Spring 43 can be a metal leaf spring, or be made of strong but resilient rubber, or the like. The bearing element 44 is preferably hemispherical as shown. When the loading platform 4 is pushed in rightwards into operative position, hemispherical bearing element 44 presses against the flat left axial end face 110 of the drive shaft 10, being pressed rather firmly thereagainst by the spring 43. This way, during operation of the cassette machine, the axial position of the horizontally extending drive shaft 10 is completely predetermined and extremely constant.

Figure 1A:
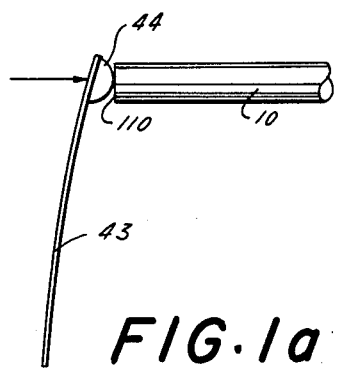
FIG. 1a is a larger-scale depiction of the left axial bearing in FIG. 1, during operation.

FIG. 1a depicts on a larger scale the axial bearing at the left end of drive shaft 10 during machine operation. In principle, the hemispherical surface of bearing element 44 contacts the flat axial end face 110 of drive shaft 10 at only a single point. Accordingly, if the direction in which spring 43 urges bearing element 44 towards end face 110 is not perfectly axial, or is somewhat unpredetermined due to unavoidable tolerance variations in production, it is nevertheless the case that the hemispherical bearing element 44 can transmit only purely axial force to end face 110, and cannot transmit radial force.

Figure 1B:
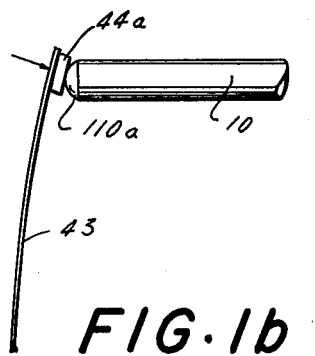

In FIG. 1b, the situation is reversed relative to FIG. 1a; the left axial end face 110a of drive shaft 10 is hemispherical, and the axial bearing element 44a proper is flat. Here, in contrast, the bearing element 44a can transmit to drive shaft end face 110a a force which includes a radial component, if urged by spring 43 against end face 110a in a direction which is not perfectly axial. Accordingly, the expedient depicted in FIG. 1a is presently preferred.

It is advantageous to use for the elastic spring 43 a leaf spring, because this has been found to reduce the tendency of drive shaft 10 to oscillate. To this end, it has been found that the axial force pressing against the end face of drive shaft 10 should be equal to at least approximately 0.4 kiloponds.

FIG. 2 depicts an embodiment in which only a single axial bearing need be employed. Numeral 115 denotes the housing of the cassette machine. The drive motor employed is of the external-rotor type and comprises an internal stator 15 secured to the machine housing 115 and an external rotor 14 surrounding the stator. The rotor shaft 13 constitutes the tape drive shaft for direct-drive in this embodiment. Drive shaft 13 extends leftwards through a radial bearing 12 secured in a bore in housing 115. Just rightwards of the right end face 20 of the radial bearing 12, drive shaft 13 is provided with an annular shoulder 30. End face 20 and shoulder 30 together limit the extent to which drive shaft 13 can shift axially to the left. Instead of using a second axial bearing to limit the extent to which drive shaft 13 can shift axially to the right, a magnetic circuit structure is employed to constantly pull drive shaft 13 leftwards, and thereby keep shoulder 30 pressed leftwards against the end face 20 of radial bearing 12.

This magnetic circuit structure includes two permanent magnets 16, 17 secured to a soft-iron yoke plate 18 screwed on machine housing 115. The circuit for magnetic flux is completed by a soft-iron annular plate 19 secured to the left axial end face of external rotor 14. The annular plate 19 is pulled leftwards towards the permanent magnets 16, 17 and firmly presses shoulder 30 leftwards against the right end face 20 of radial bearing 12. In this embodiment, the stator 15 can be pulled rightwards out of the rotor 14, and the rotor will stay in place due to the magnetic holding force.

In the embodiment of FIG. 3, the rotor can be pulled off rightwards from behind. Here, the stator 25 is located at the side of the rotor 24 which faces towards the cassette to be driven, and the stator 25 is secured directly to the machine housing 21. A radial bearing 22 is secured in a bore in housing 21. As before, the rigidly connected together rotor 24 and drive shaft 23 are mounted by virtue of the fact that drive shaft 23 extends from rotor 24 through radial bearing 22. It will be understood that radial bearing 22 is nonrotatable. The axial locating of the drive shaft 28 is performed by an axial bearing 200, 300. Numeral 200 denotes a bearing plate secured to a U-shaped bracket 80 in turn secured to machine housing 21. The right end face 300 of drive shaft 23 may be hemispherical or, for example, conical. Two permanent magnets 26, 27 are secured to U-shaped bracket 80, which latter is preferably of soft iron. Secured to the right axial end face of rotor 24 is a soft iron annular plate 29 which completes the path for magnetic flux. The permanent magnets 26, 27 pull annular plate 29, and therefore rotor 24 and drive shaft 23 rightwards, thereby pressing bearing surface 300 against bearing plate 200. U-shaped bracket 80 is rigidly but dismountably secured to machine housing 21.

Advantageously, the drive motor employed is a collectorless D.C. motor provided with ferromagnetic structure generating a compensatory reluctance torque, such as disclosed in commonly owned U.S. Pat. No. 3,840,761 or in commonly owned U.S. patent application Ser. No. 706,550 filed July 21, 1976, the entire disclosures of which are incorporated herein by reference.

In the illustrated embodiments, the cassette machine is of the direct-drive type, i.e., wherein the tape drive shaft is constituted by the motor shaft itself. However, an indirect drive can likewise be employed as shown in FIG. 4, in which case it is preferred to provide the indirectly driven tape drive shaft with a coaxial flywheel to improve the constancy of its rotary speed.

It will be understood that each of the elements described above, or two or more together, may also find a useful application in other types of constructions differing from the types described above.

While the invention has been illustrated and described as embodied in particular cassette-machine designs, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a magnetic-tape cassette machine of the type comprising a machine housing, a tape transport mechanism including a horizontally extending tape drive shaft, and a loading platform accommodating a cassette and designed to hold the cassette upright during tape transport, the cassette loading platform being mounted for movement between an inoperative position in which a cassette can be loaded into or unloaded from the loading platform and an operative position in which the cassette tape is engaged by the horizontally extending tape drive shaft, an arrangement for axially bearing and locating the horizontally extending tape drive shaft, the arrangement comprising in combination a first axial bearing mounted on a stationary part of the machine housing and limiting axial movement of the horizontally extending tape drive shaft in a first direction; and a second axial bearing mounted on the loading platform and operative when the loading platform is in operative position for limiting axial movement of the horizontally extending tape drive shaft in the direction opposite to the first direction.

2. In a cassette machine as defined in claim 1, the second axial bearing including a biasing structure secured to the loading platform and carrying a bearing element pressed by the biasing structure against an axial end face of the tape drive shaft.

3. In a cassette machine as defined in claim 2, the bearing element being hemispherical.

4. In a cassette machine as defined in claim 2, said axial end face of the tape drive shaft being hemispherical.

5. In a cassette machine as defined in claim 2, the biasing structure being a leaf spring having one end secured to the loading platform and having also a free end carrying the bearing element.

6. In a cassette machine as defined in claim 1, the first axial bearing pressing against one axial end face of the tape drive shaft, and the second axial bearing pressing against the other axial end face of the tape drive shaft.

7. In a magnetic-tape cassette machine of the type comprising a machine housing, a tape transport mechanism including a horizontally extending tape drive shaft, and a loading platform accommodating a cassette and designed to hold the cassette upright with the cassette tape engaged by the tape drive shaft, an arrangement for axially bearing and locating the horizontally extending tape drive shaft, the arrangement comprising in combination an axial bearing mounted on the machine housing and limiting axial movement of the horizontally extending tape drive shaft in a first direction; and magnetic means operative for pulling the tape drive shaft axially in said first direction to prevent movement of the tape drive shaft away from the axial bearing in the direction opposite to the first direction.

8. In a cassette machine as defined in claim 7, the magnetic means comprising a permanent magnet structure secured to a stationary part of the machine housing and, adjoining the permanent magnet structure, an annular structure of magnetically conductive material secured to the tape drive shaft.

9. In a cassette machine as defined in claim 8, the permanent magnet structure comprising two permanent magnets located equally spaced from the longitudinal axis of the tape drive shaft and at diametrically opposite sides of the longitudinal axis.

10. In a cassette machine as defined in claim 7, the tape transport mechanism including an electric motor whose output shaft constitutes the tape drive shaft.

11. In a cassette machine as defined in claim 7, the magnetic means being radially remote from the tape drive shaft.

12. In a cassette machine as defined in claim 7, the magnetic means being radially adjacent the tape drive shaft.

13. In a cassette machine as defined in claim 10, the electric motor being a collectorless D.C. motor.

14. In a cassette machine as defined in claim 10, the electric motor being provided with a ferromagnetic structure generating a compensatory reluctance torque.

15. In a cassette machine as defined in claim 7, the tape transport mechanism being an indirect-drive tape transport mechanism including an electric motor having an output shaft driving the tape drive shaft.

16. In a cassette machine as defined in claim 15, the tape drive shaft being provided with a flywheel.

17. In a cassette machine as defined in claim 7, the axial bearing being a hemispherical bearing.

* * * * *